US006373889B1

(12) United States Patent
Alelyunas et al.

(10) Patent No.: US 6,373,889 B1
(45) Date of Patent: Apr. 16, 2002

(54) IN-BAND SIGNAL AND DETECTOR FOR PCM MODEM EXCEPTION PROCESSING

(75) Inventors: Carl H. Alelyunas, Nevada City, CA (US); Vladimir Parizhsky, New York, NY (US); Andrew Norrell, Nevada City, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/085,411

(22) Filed: May 27, 1998

(51) Int. Cl.[7] ............................................. H03H 21/00
(52) U.S. Cl. ........................................................ 375/233
(58) Field of Search ................................. 375/233, 242, 375/216, 222, 232; 379/93.28, 93.31, 93.33

(56) References Cited

U.S. PATENT DOCUMENTS

| 4,288,664 A | * | 9/1981 | Araseki | 379/407 |
| 5,859,872 A | * | 1/1999 | Townshend | 375/242 |
| 5,923,651 A | * | 7/1999 | Struhsaker | 370/342 |
| 6,002,713 A | * | 12/1999 | Goldstein et al. | 375/222 |
| 6,101,216 A | * | 8/2000 | Henderson et al. | 375/222 |

* cited by examiner

Primary Examiner—Chi Pham
Assistant Examiner—Kevin M Burd
(74) Attorney, Agent, or Firm—McDonnell Boehnen Hulbert & Berghoff

(57) ABSTRACT

A signal for exception processing is provided. The signal includes a first sequence of PCM codewords. Each PCM codeword in the sequence has a magnitude corresponding to a maximum point within an active constellation. The signal further includes a timing mark following the first sequence. In addition, a client device is provided. The client device includes a receiver and a detector coupled to the receiver. The receiver is coupled to an analog subscriber loop and has a decision feedback equalizer. The receiver provides a decision corresponding to data sent by a digital data source. The detector monitors the decision of the receiver to determine when an exception has been requested by the digital data source. Further, a method of requesting a change in a mode of operation of a client device when the client device is operating in a data mode is provided. The data mode includes receiving signal points selected from an active constellation and deciding which points have been received to thereby recover data. The method includes the step of transmitting, to the client device, a predetermined sequence of points from the active constellation. Each of the points in the predetermined sequence has the same index relative to a maximum point within the active constellation. The method further includes the steps of receiving the transmitted sequence, and detecting the predetermined sequence.

13 Claims, 6 Drawing Sheets

IN-BAND SIGNAL AND DETECTOR FOR PCM MODEM EXCEPTION PROCESSING

BACKGROUND OF THE INVENTION

A. Field of the Invention

The present invention relates to a method and apparatus for exception processing in a pulse code modulation ("PCM") communication environment. More particularly, the present invention relates to an in-band signal for exception processing in a PCM modem. A detection method and apparatus is also provided.

B. Description of the Related Art

For many years the public digital telephone network ("DTN") has been used for data transmission between modems. Typically, a modulated carrier is sent over a local loop to a service provider (e.g., a Regional Bell Operating Company), whereupon the service provider quantizes the signal for transmission through the DTN. A service provider that is located near the receiving location converts the digital signal back to an analog signal for transmidssion over a local loop to the receiving modem. This system is limited in the maximum achievable data rate at least in part by the sampling rate of the quantizers, which is typically 8 kHz (which rate is also the corresponding channel transmission rate, or clock rate, of the DTN).

Furthermore, the analog-to-digital (A/D) and digital-to-analog (D/A) conversions are typically performed in accordance with a non-linear quantizing rule. In North America, this conversion rule is known as $\mu$-law. A similar nonlinear sampling technique known as A-law is used in other areas of the world such as Europe. The non-linear A/D and D/A conversion is generally performed by a codec (coder/decoder) device located at the interfaces between the DTN and local loops. Alternatively, these devices are referred to herein as a DAC (digital-to-analog converter) and an ADC (analog-to-digital converter).

It has been recognized that a data distribution system using the public telephone network can overcome certain aspects of t he aforesaid limitations by providing a digital data source connected directly to the DTN, without an intervening codec. In such a system, the telephone network routes digital signals from the data source to a client's local subscriber loop without any intermediary analog facilities, such that the only analog portion of the link from the data source to the client is the client's local loop (plus the associated analog electronics at both ends of the local loop). The only codec in the transmission path is the one at the DTN end of the client's subscriber loop.

FIG. 1 shows a block diagram of a data distribution system. The system includes a data source 10, or server, having a direct digital connection 30 to a digital telephone network (DTN) 20. A client 40 is connected to the DTN 20 by an analog subscriber loop 50 that is typically a two-wire, or twisted-pair, cable. The DTN 20 routes digital signals from the data source 10 to the client's local subscriber loop 50 without any intermediary analog facilities such that the only analog portion of the link from the server 10 to the client 40 is the subscriber loop 50. The analog portion of the system thus includes the channel characteristics of the subscriber loop 50 plus the associated analog electronics at both ends of the subscriber loop 50.

The analog electronics are well known to those skilled in the art and typically include a subscriber line interface card at the central office that includes a codec, as well as circuitry used to generate and interpret call progress signals (ring voltage, on-hook and off-hook detection, etc.). In the system of FIG. 1, the only codec in the transmission path from the server 10 to the client 40 is a DAC located at the DTN 20 end of the subscriber loop 50. It is understood that the client-side, or subscriber-side, equipment may incorporate an ADC and DAC for its internal signal processing, as is typical of present day modem devices. For the reverse channel, the only ADC converter in the path from the client 40 to the server 10 is also at the DTN 20 end of the subscriber loop 50.

In the system of FIG. 1, the server 10, having direct digital access to the DTN 20 may be a single computer, or may include a communications hub that provides digital access to a number of computers or processing units. Such a hub/server is disclosed in U.S. Pat. Nos. 5,528,595 and 5,577,105, the contents of which are incorporated herein by reference.

In the system shown in FIG. 1, digital data can be input to the DTN 20 as 8-bit bytes (octets) at the 8 kHz clock rate of the DTN. This is commonly referred to as a DS-0 signal format At the interface between the DTN 20 and the subscriber loop 50, the DTN 20 codec converts each byte to one of 255 analog voltage levels (two different octets each represent 0 volts, i.e plus 0 volts and minus 0 volts) that are sent over the subscriber loop 50 and received by a decoder at the client's location. The last leg of this system, i.e., the local loop 50 from the network codec to the client 40, may be viewed as a type of baseband data transmission system because no carrier is being modulated in the transmission of the data. The baseband signal set contains the positive and negative voltage pulses output by the codec in response to the binary octets sent over the DTN. The client 40, as shown in FIG. 1, may be referred to herein as a PCM modem.

FIG. 2 is a graph showing a $\mu$-law to linear conversion for one-half of the $\mu$-law codeword set used by the DTN 20 codec. As shown in FIG. 2, the analog voltages (shown as decimal equivalents of linear codewords having 16 bits) corresponding to the quantization levels are non-uniformly spaced and follow a generally logarithmic curve. In other words, the increment in the analog voltage level produced from one codeword to the next is not linear, but depends on the mapping as shown in FIG. 2. Note that the vertical scale of FIG. 2 is calibrated in integers from 0 to 32,124. These numbers correspond to a linear 16-bit A/D converter. As is known to those of ordinary skill in the art, the sixteenth bit is a sign bit which provides integers from 0 to −32124 which correspond to octets from 0 to 127, not shown in FIG. 2. Thus FIG. 2 can be viewed as a conversion between the logarithmic binary data and the corresponding linear 16-bit binary data. It can also be seen in FIG. 2 that the logarithmic function of the standard conversion format is approximated by a series of 8 linear segments.

The conversion from octet to analog voltage (or a digital representation of the analog voltage, as discussed above) is well known, and as stated above, is based on a system called $\mu$-law coding in North America and A-law coding in Europe. Theoretically, there are 256 points represented by the 256 possible octets, or $\mu$-law codewords. The format of a $\mu$-law codeword is shown in FIG. 3, where the most significant bit $b_7$ indicates the sign of the codeword, and the remaining seven bits, $b_6$–$b_0$, represent the magnitude of the codeword. Referring to FIG. 2, it may be observed that the three bits $b_6$–$b_4$ represent the linear segment in the conversion graph, and the four bits, $b_0$–$b_3$ indicate the step along the particular, linear segment in the conversion graph. These points are symmetric about zero; i.e., there are 128 positive and 128 negative levels, including two encodings of zero. Since there are 254 non-zero points, the maximum number of bits that can be sent per signaling interval (symbol) is just under 8 bits.

A $\mu$-law or A-law codeword utilized by the DTN 20 may be referred to herein as a PCM codeword. It is actually the PCM codeword that results in the DTN 20 codec to 5 output a particular analog voltage. The codeword and the corresponding voltage may be referred to herein as "points." The client 40, shown in FIG. 1, may be referred to herein as a PCM modem.

Other factors, such as robbed-bit signaling, digital attenuation (pads), channel distortion and noise introduced by the subscriber loop, and the crowding of points at the smaller voltage amplitudes and the associated difficulty in distinguishing between them at the decoder/receiver, may reduce the maximum attainable bit rate. Robbed Bit Signaling (RBS) involves the periodic use of the least significant bit (LSB) of the PCM codeword by the DTN 20 to convey control information. Usually the robbed bit is replaced with a M4 logical '1' before transmission to the client 40. Typically, the DTN performs robbed-bit signalling on a cyclic basis, robbing the LSB of an individual channel every sixth PCM codeword. In addition, due to the fact that a channel might traverse several digital networks before arriving at the terminus of the DTN 20, more than one PCM codeword per 6 time slot frame may have a bit robbed by each network, with each network link robbing a LSB.

During a communication session, the client device, whether a PCM modem or a conventional modem such as a V.34 modem, typically proceeds to steady state operation after initial start-up and training procedures are executed. As used herein, the term V.34 modem means a modem that complies with Recommendation V.34 (1994) as established by the International Telecommunication Union, Telecommunication Standardization Sector, the contents of which are incorporated herein by reference. Steady state operation refers to the reception and transmission of data, as opposed to control signals and the like, by the client device. Steady state operation is sometimes referred to as the "data mode." Over the course of the communication session, it may be desirable to change the mode of the client device, such as switching the client device out of steady state operation. Exception processing, as the term is used herein, refers to techniques and/or associated hardware/software for indicating the desirability of changing the mode of the client device. A mode change for the client device may also be referred to herein as an exception. Typical exceptions for conventional modems include retrains and rate renegotiation.

There are known exception processing techniques. For example, while a V.34 modem is in session it is often the case that changing conditions of the transmission medium require that a different modulation rate be used for an optimal (in terms of the speed v. reliability tradeoff) rate of data exchange. In accordance with Recommendation V.34, the request for rate renegotiation is handled by generating a unique signal sequence that is not within the set of signalling points used for the transmission of data. Exception to processing techniques that use unique signal points, which are not within the set of signalling points used for the transmission of data, may be referred to herein as "out-of-band" techniques.

FIG. 4 illustrates a four point constellation that is used by V.34 modems to request a rate renegotiation. In FIG. 4, the 0's represent the points that are sent to request a rate renegotiation, whereas the x's represent QAM constellation points for V.34. Because the points for requesting a rate renegotiation (e.g., 0's) are not within the set of signalling points used for the transmission of data (e.g., x's), this is an example of an out-of-band signal for exception processing. A V.34 modem will typically have an independent detection mechanism for detecting the rate renegotiation request.

A disadvantage of this approach is that the independent detection mechanism unduly complicates modem hardware and/or consumes processing resources, instruction time or code space if the independent detection mechanism is implemented algorithmically within a digital signal processor. A further disadvantage of this approach arises in the context of the PCM modem. Specifically, the out-of-band signal may lead to divergence of any adaptive mechanisms that use equalizer error for convergence in the PCM modem.

It would therefore be desirable to have an improved method and apparatus for exception processing.

SUMMARY OF THE INVENTION

In accordance with a first aspect of the present invention, a signal for exception processing is provided. The signal includes a first sequence of PCM codewords. Each PCM codeword in the sequence has a magnitude corresponding to a maximum point within an active constellation. The signal further includes a timing mark following the first sequence.

In accordance with a second aspect of the present invention, a client device is provided. The client device includes a receiver and a detector coupled to the receiver. The receiver is coupled to an analog subscriber loop and has a decision feedback equalizer. The receiver provides a decision corresponding to data sent by a digital data source. The detector monitors the decision of the receiver to determine when an exception has been requested by the digital data source.

In accordance with a third aspect of the present invention, a method of requesting a change in a mode of operation of a client device when the client device is operating in a data mode is provided. The data mode includes receiving signal points selected from an active constellation and deciding which points have been received to thereby recover data. The method includes the step of transmitting, to the client device, a predetermined sequence of points from the active constellation. Each of the points in the predetermined sequence has the same index relative to the maximum point within the active constellation. The method further includes the steps of receiving the transmitted sequence, and detecting the predetermined sequence.

DETAILED DESCRIPTION OF THE PRESENTLY PREFERRED EMBODIMENT(S)

The presently preferred embodiments of the invention will now be described with reference to the drawings, wherein like elements are referred to by like numerals. A method and apparatus for exception processing in a PCM communication environment are provided. Accordingly, the data distribution system preferably takes the form of the system shown in FIG. 1. Specifically, an analog subscriber loop 50 connects a client device 40 to a DTN 20. In addition, a data source 10, or server, has a direct digital connection 30 to the DTN 20.

The client device 40 may also be referred to herein as an analog modem or a PCM modem, although the client device 40 is not limited to what is conventionally thought of as an analog modem. For example, the client device 40 may be a server having an analog modem connection to the subscriber loop 50, a bank of analog modems, a microprocessor that supports analog modem functionality or the like. All that is required is that the client device 40 includes a transmitter that is capable of functioning in accordance with the well known analog modem principles. Preferably, the transmitter in the client device 40 complies with Recommendation V.34.

The data source 10 may also be referred to herein as a digital modem. As described above, the data source 10 has a direct digital connection 30 to the DTN 20. Thus, a receiver in the data source 10 is preferably operable to receive digital representations of Recommendation V.34 signals from the DTN 20, such as may be generated by the DTN 20 in response to V.34 signals from the transmitter of the client device 40. In addition, an encoder in the data source 10 is preferably operable to send digital data to the DTN 20 in the form of 8-bit bytes (octets) at the 8 kHz clock rate of the DTN 20, as described above. When in data mode, the encoder in the data source 10 is preferably operable to generate digital codewords in compliance with ITU-T Recommendation G.711 (1988), the contents of which are incorporated herein by reference.

Figure 1:
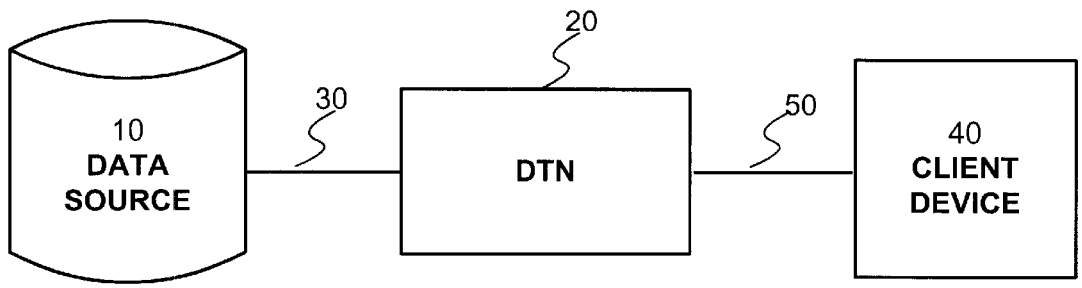
FIG. 1 shows a communications network with a data source having direct digital access to a digital telephone network.
Figure 3:
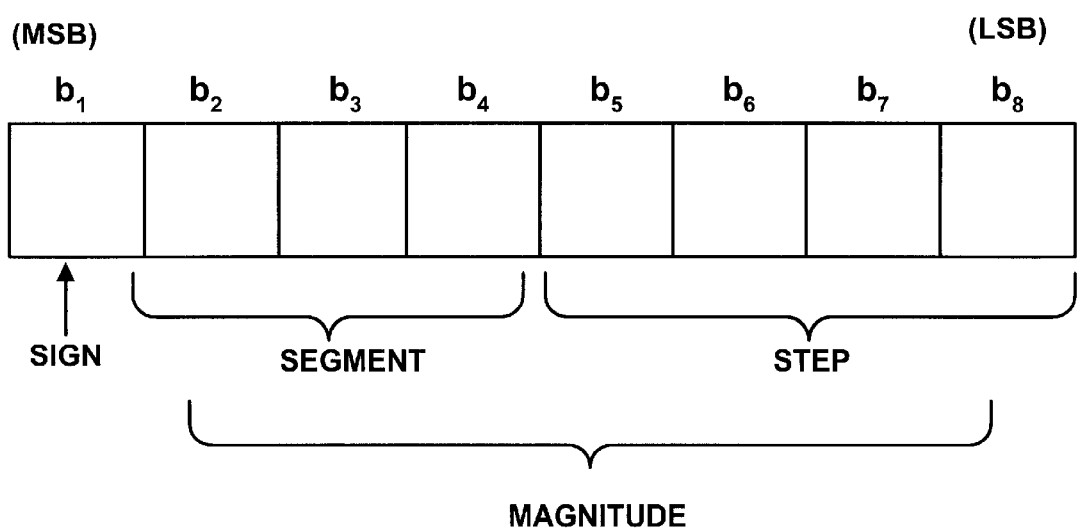
FIG. 3 shows the elements of a $\mu$-law codeword.

In operation, the data source 10 and the client device 40 preferably communicate over the data distribution system shown in FIG. 1 as follows. For communication in the downstream direction, i.e. from the data source 10 to the client device 40, PCM modulation at a symbol rate of 8000, which may provide data signalling rates from 28,000 bits/s to 56,000 bits/s, with a theoretical maximum of 64,000 bits/s. In the upstream direction, i.e. from the client device 40 to the data source 10, V.34 modulation to provide data signalling rates from 4800 bits/s to 33,600 bits/s. Other modulation and/or encoding techniques may alternatively be used in the upstream channel.

Figure 5:
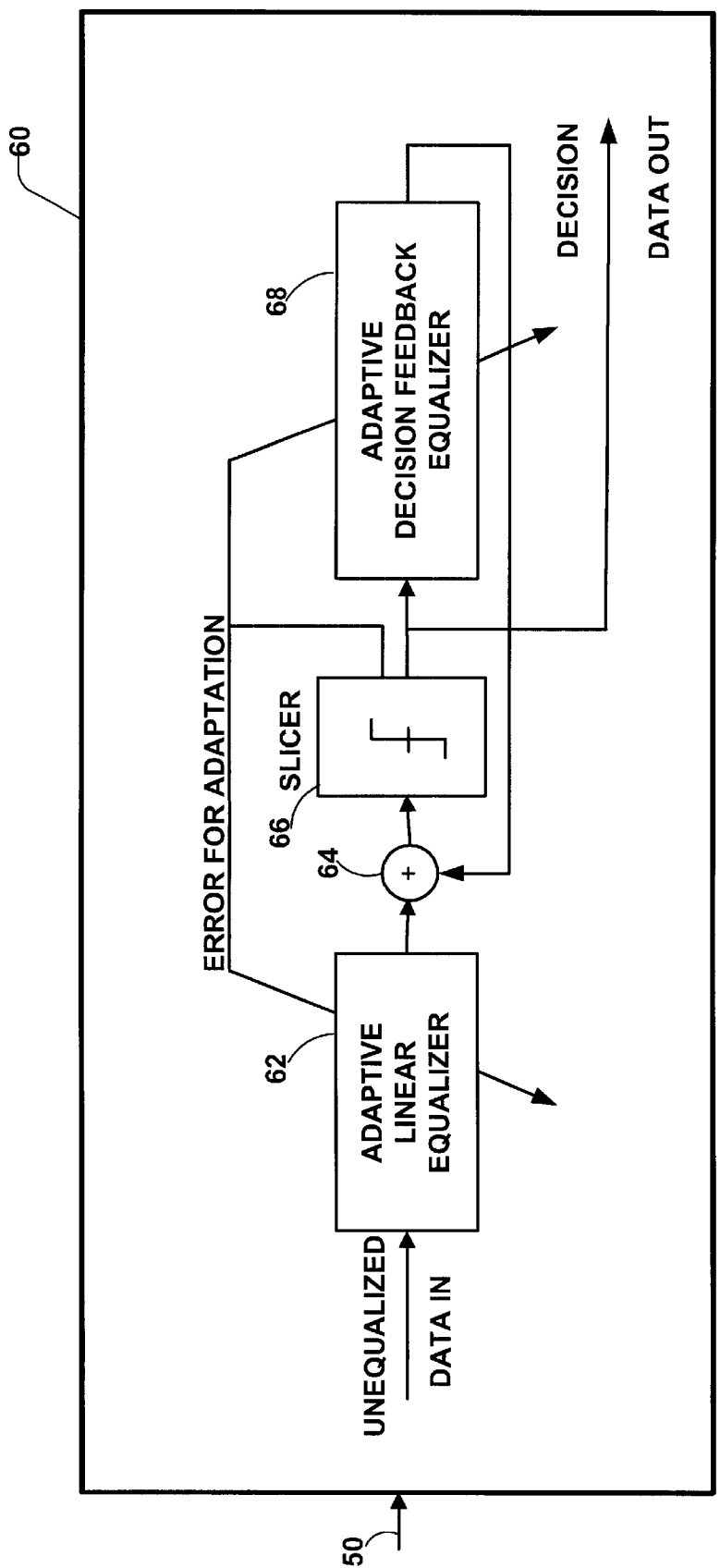
FIG. 5 is a functional block diagram of a receiver in a client device, in accordance with a preferred embodiment of the present invention.

FIG. 5 is a functional block diagram of a receiver 60 in the client device 40, in accordance with a preferred embodiment of the present invention. The receiver 60 includes a linear equalizer 62, which is coupled to receive linear data from the subscriber loop 50. The output of the linear equalizer 62 is coupled to a first input of a summer 64. The summer 64 provides an output to a slicer 66, which provides the decision (also referred to herein as the data out). The slicer 66 is also coupled to a decision feedback equalizer 68. The output of the decision feedback equalizer 68 is coupled to a second input of the summer 64.

Preferably, the linear equalizer 62 and the decision feedback equalizer 68 are adaptive, as shown in FIG. 5. In particular, an error signal derived from the slicer 66 may be used to adapt the linear equalizer 62 and the decision feedback equalizer 68 so that the inputs to the slicer 66 converge to valid points. Adaptive equalization techniques are known to those skilled in the art.

In a data distribution system having a client device 40 as described above, exception processing may be performed in accordance with a preferred embodiment as follows. For this embodiment, the exception processing relates to a request for rate renegotiation. Other exception processing techniques may alternatively be accomplished utilizing the methods and/or devices described herein.

A rate renegotiation request may arrive at any time while the receiver 60 is active. If the rate renegotiation request is indicated by a signal sequence that is not within a valid sequence of points within the PCM modem, the decision mechanism (i.e. the slicer 66) associated with the decision feedback equalizer 68 will select the nearest valid point to represent the received point, thereby misinterpreting the received signal. Moreover, the difference between the received point and the nearest valid point will likely then be misinterpreted as equalizer error. This is problematic in the PCM modem environment because it leads to divergence of any adaptive mechanisms within the PCM modem that use the equalizer error for convergence, such as the linear equalizer 62 and the decision feedback equalizer 68 shown in FIG. 5.

Therefore, in accordance with a preferred embodiment of the present invention, an in-band signalling scheme is used for exception processing. An advantage of in-band signalling for exception processing is that the in-band signal will not interfere with the ordinary operation of the decision feedback equalizer 68 or the linear equalizer 62.

Figure 6:
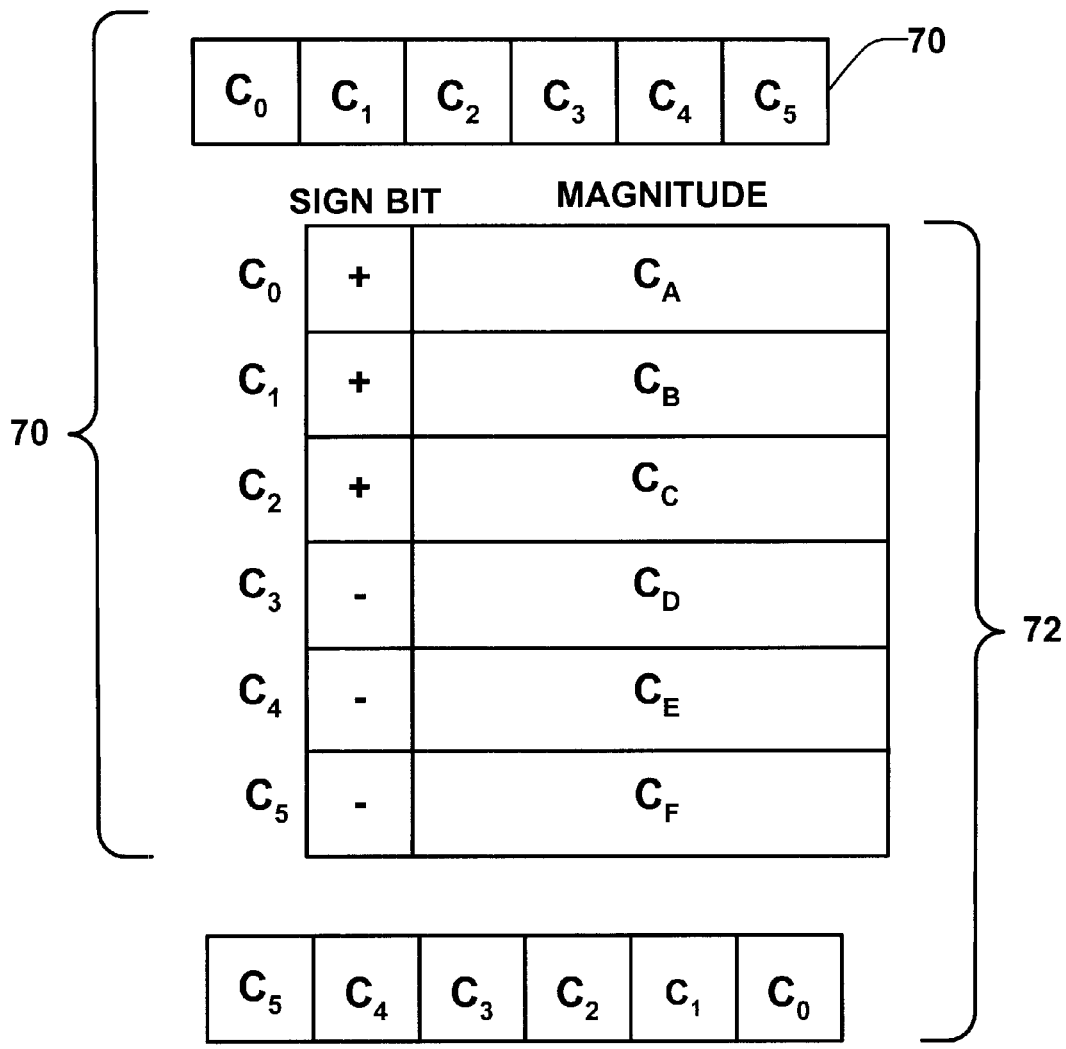
FIG. 6 illustrates an in-band signal for exception processing in accordance with a preferred embodiment of the present invention.

A preferred in-band signal for exception processing will now be described. FIG. 6 illustrates an in-band signal for exception processing in accordance with a preferred embodiment of the present invention. The signal is formed from a first sequence 70 and a second sequence 72. The first sequence 70 includes six codewords, all having the same index relative to a maximum point within the active constellation. The sign bits of the six codewords in the first sequence 70 follow the pattern +++---, i.e. the first three codewords have a positive sign bit and the second three codewords have a negative sign bit. The second sequence 72 shown in FIG. 6 is the inverse of the first sequence 70. Specifically, the second sequence 72 includes six codewords, all having the same index relative to a maximum point within the active constellation, in which the sign bit of the first three codewords is negative and the sign bit of the second three codewords is positive.

Preferably, the magnitude of each codeword in the first sequence 70 and the second sequence 72 corresponds to the largest point in the active signalling constellation. The active signalling constellation is the set of points corresponding to the subset of PCM codewords currently in use for communication between the data source 10 and the client device 40. The active constellation may be negotiated by the data source 10 and the client device 40, during initial training or retrains, based upon the quality of the connection between the data source 10 and the client device 40.

Figure 2:
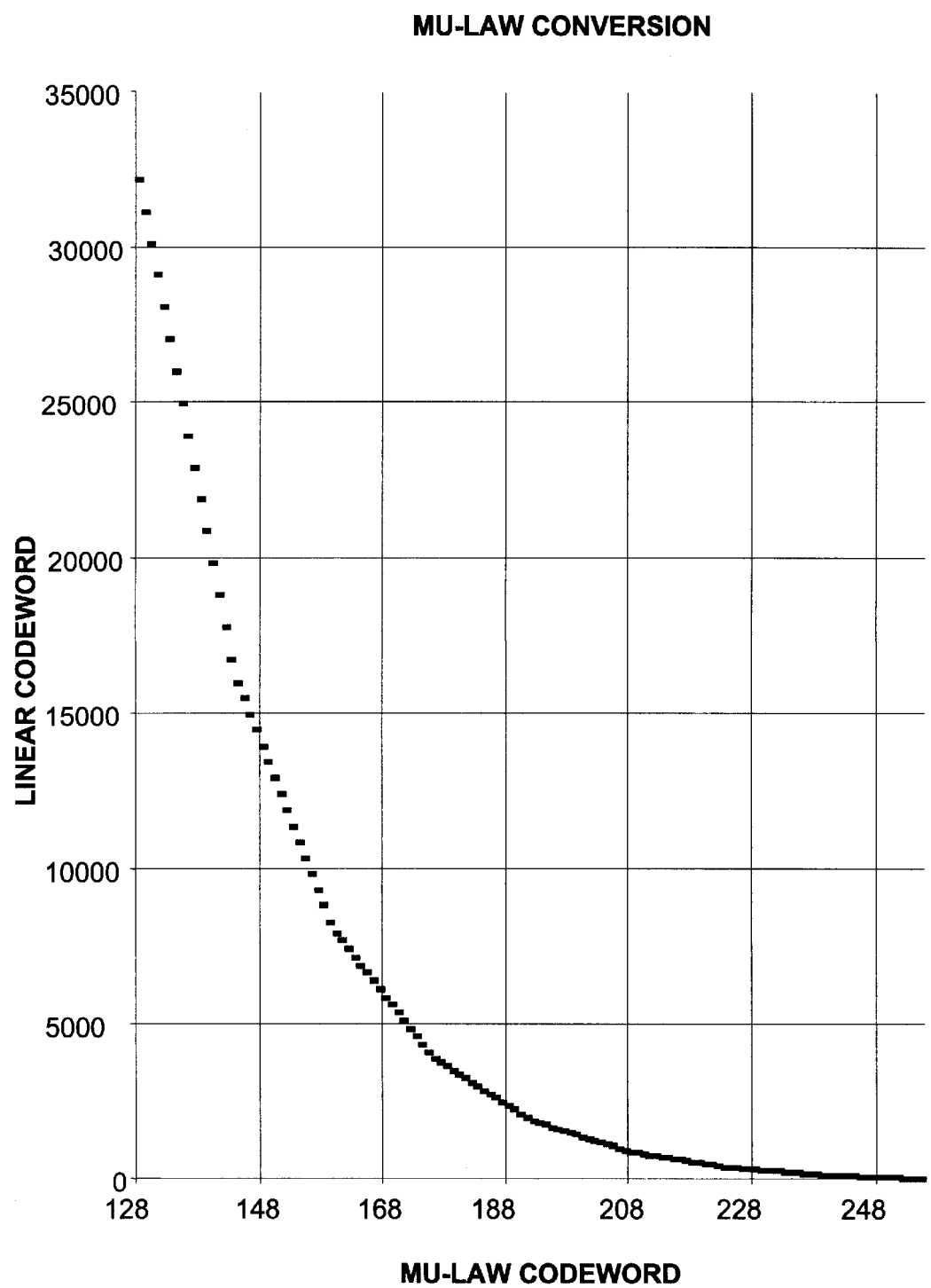
FIG. 2 shows a $\mu$-law to linear conversion graph.
Figure 4:
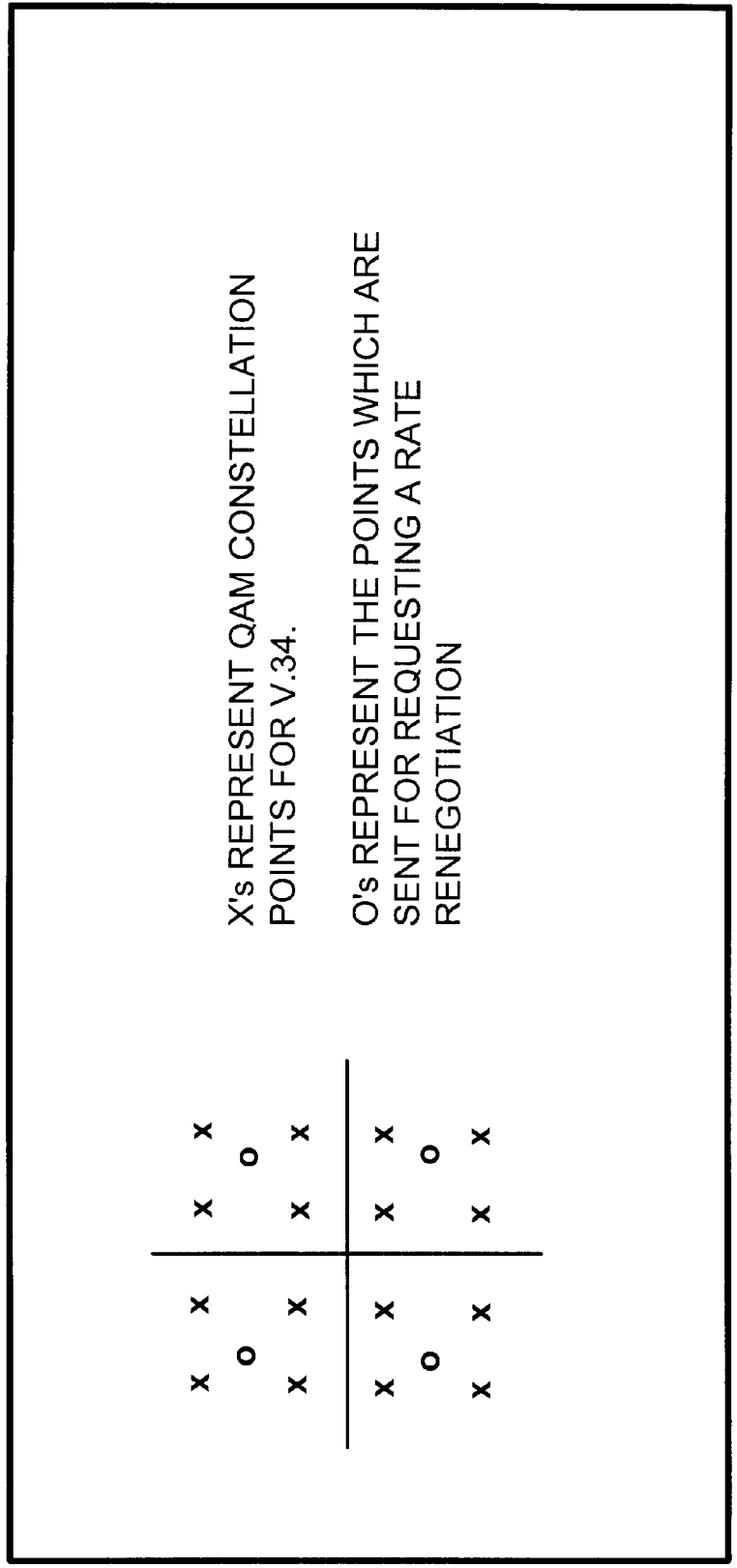
FIG. 4 illustrates a four point constellation that is used by V.34 modems to request a rate renegotiation.

As shown in FIG. 2, the greatest distance between points in a PCM coding system occurs at the largest points. Accordingly, it is the largest points that are most reliably detected. The in-band signal shown in FIG. 6, therefore, is preferably composed of the largest magnitude point within the signalling constellation currently in use by the client device.

Since the DTN 20 channel may be corrupted at a periodic rate every six codewords by robbed bit signalling, the transmitter at the server 10 preferably utilizes a signalling scheme that is based upon a six codeword frame. It is therefore preferable for the exception processing signal to be constructed on a six codeword frame. As noted above, the in-band signal shown in FIG. 6 preferably is formed from the first sequence 70 of six codewords, in which the magnitude of the codewords corresponds to the largest point in the active constellation and the sign of the codewords follows the pattern: +++--- (three positive, followed by three negative). Because of robbed-bit signalling and other impairments brought about by the DTN 20, different constellations may be active for each time slot in the six codeword frame. Thus, the six codewords used for exception processing may not all have the same magnitude, but will have the same index (i.e. each is the largest magnitude in the active constellation).

The first sequence 70 may be repeated as necessary to decrease the likelihood of misinterpreting a data signal as the exception processing signal. A timing mark may be generated by sending a second sequence 72, which is preferably the inverse of the first sequence 70: ---+++ (three negative, followed by three positive). Although the first sequence 70 may begin at any time slot in the frame, it is preferable that the first sequence 70 start on a frame boundary.

A further advantage of the first sequence 70 is that, on a frame-by-frame basis (six codewords in this context), it has no spectral component at DC. It is desirable to minimize the DC component of signals transmitted over the analog subscriber loop 50. Moreover, in terms of time, the exception processing signal shown in FIG. 6, may be significantly shorter than known exception processing signals, such as the rate renegotiation signal specified in Recommendation V.34. It is desirable to minimize time spent on exception processing.

As an alternative to the exception processing signal shown in FIG. 6, the use of the first sequence 70 and the second sequence 72 may be interchanged. That is, the second sequence 72 may be sent initially, followed by the first sequence 70, which then serves the function of the timing mark. Further alternatives will become apparent to those skilled in the art upon reviewing this detailed description. For example, a different codeword magnitude may be used, such as the second largest or third largest magnitude in the active signalling constellation, although the number of repetitions of the first sequence may have to be correspondingly increased to ensure that exception processing is desired. As a further example, the pattern of the sign bit may be varied from that set forth in FIG. 6, although it is preferable that an equal number of positive and negative sign bits be used.

Figure 7:
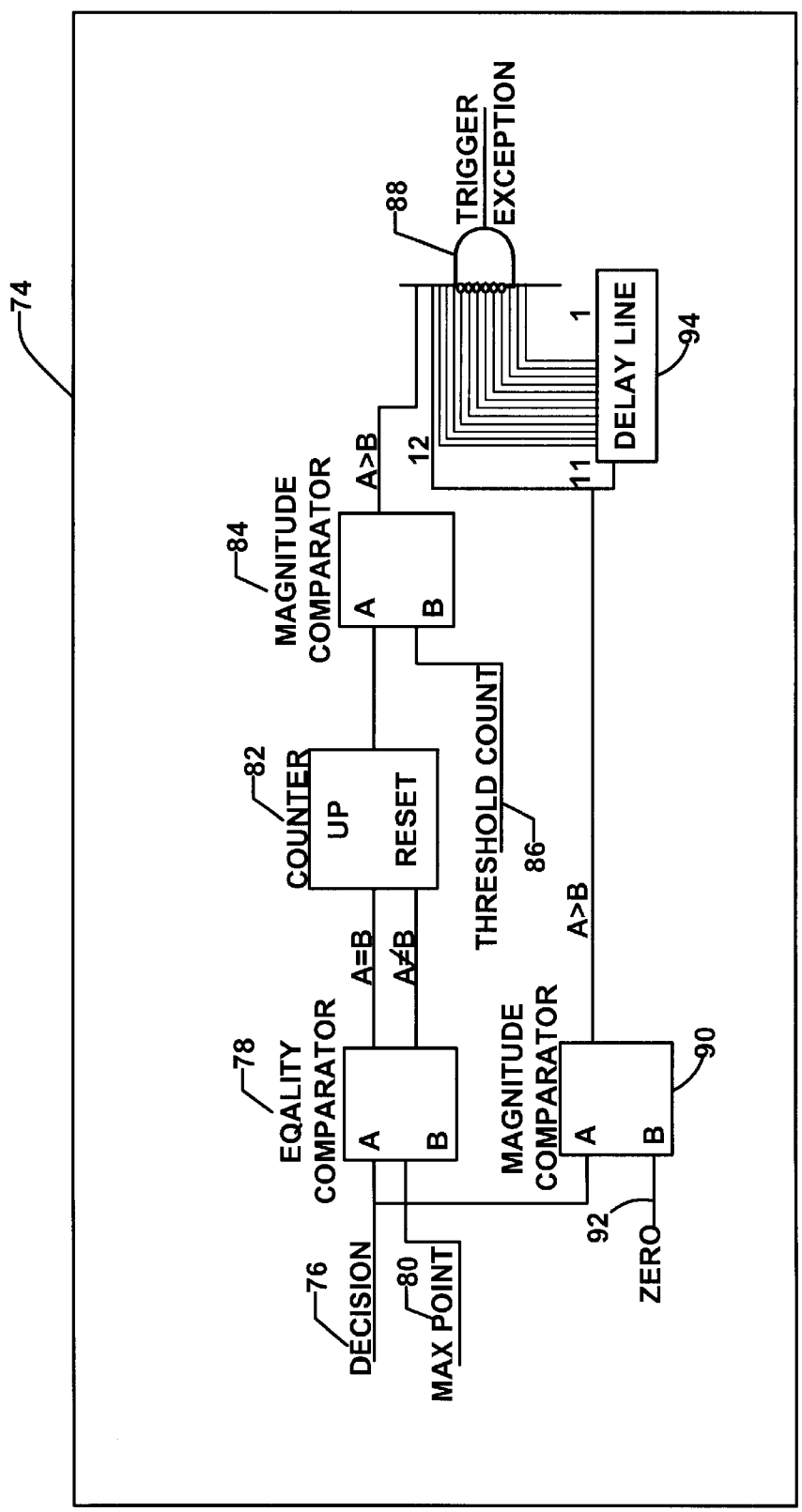
FIG. 7 is a block diagram of an embodiment of a detector for the in-band signal shown in FIG. 6.

FIG. 7 is a block diagram of an embodiment of a detector 74 for the exception processing signal shown in FIG. 6. The detector 74 is coupled to the receiver 60 and is preferably contained within the client device 40. The detector 74 receives the decision 76 provided at the output of the receiver 60 shown in FIG. 5. The decision 76 is inputted to an equality comparator 78. The largest point 80 in the active signalling constellation is also inputted to the comparator 78. The comparator 78 is coupled to a counter 82, which is in turn coupled to a second comparator 84. The second comparator 84 compares the output of the counter 82 to a threshold count 86. The output of the second comparator 84 is coupled to an And gate 88.

The decision 76 is also coupled to an input of a third comparator 90. A second input 92 of the third comparator 90 is clamped to zero. The output of the third comparator is coupled, in parallel, to the And gate 88 and a delay line 94. The delay line 94 couples the previous eleven outputs of the third comparator 90 to the And gate 88. The signals on lines 4 through 9 from the delay line 94 to the And gate 88 are negated.

The detector 74 shown in FIG. 7 operates as follows. The comparator 78 compares the decision 76 to the largest point 80 in the active constellation. If the decision 76 equals the largest point 80, then the counter 82 increments. Otherwise the counter 82 is reset. These steps are repeated for each decision 76 from the receiver 60. When the number of consecutive maximum magnitude decisions 76, as tracked by the counter 82, exceeds the threshold count 86, the output of the comparator 84 goes high. In parallel with these counting/comparing steps, the comparator 90 extracts the sign bits of the decisions 76. The current sign bit is provided directly by the comparator 90 to the And gate 88, whereas the eleven previous sign bits are provided by the delay lame 94 to the And gate 88. In this manner, a template is formed for tracking the latest twelve sign bits. When the inputs to the And gate 88 are true, the output goes high, signalling that an exception has been requested.

In accordance with a preferred embodiment of the invention, the exception processing signal shown in FIG. 6 is utilized for initiating rate renegotiation in a PCM modem. For this embodiment, the first sequence 70 is sent repeatedly, followed by the second sequence 72. As noted above, the counter 82 in the detector 74 shown in FIG. 7 counts upwards as the maximal points (decisions) are detected. The counter 82 preferably resets to zero if a point is received that is not a maximum point. The output of the counter 82 may then be compared to the threshold 86. If the count provided by the counter 82 exceeds the threshold 86, then the sign bits from the last twelve codewords are compared to a template in the form: +++------+++. The comparison will be true if the rate renegotiation request, including the first sequence 70 followed by the second sequence 72, was received by the detector 74. If the comparison is true, then the client device 40 leaves the data mode and enters a predetermined rate renegotiation procedure.

The likelihood of a random data stream having greater than the threshold number of maximum constellation points can be made sufficiently small by increasing the threshold. For example, with a constellation of nine points and a threshold of twenty, the chance of a random data event having in excess of twenty consecutive maximum points is 1 in $1 \times 10^{19}$. Other repetitions of the first sequence 70 and the second sequence 72 may alternatively be used. For example, the first sequence 70 may be sent forty-eight times followed by the one repetition of the second sequence 72. The second sequence 72 may also be sent repetitively.

It is intended that the foregoing detailed description be regarded as illustrative rather than limiting. Other embodiments, which may embody the principles of the present invention, may be readily devised by those skilled in the art in light of the foregoing. Accordingly, it is to be understood that the exception processing method and apparatus described herein are not limited to the specific illustrations provided, but may assume other embodiments limited only by the scope of the following claims, including all equivalents thereto.

We claim and desire to be secured by Letters Patent:

1. In a distribution system utilizing public telephone network that includes a digital telephone network, in which a digital data source is connected directly to the digital telephone network and a client device is connected by an analog subscriber loop to the digital telephone network, the client device comprising:
- a receiver coupled to the analog subscriber loop, the receiver including a decision feedback equalizer and providing a decision corresponding to data sent by the data source; and
- a detector coupled to the receiver, wherein the detector comprises:
  an And gate;
  a counter coupled to an input of the And gate;
  a means for extracting a sign bit from the decision; and
  a means for coupling a predetermined number of sign bits to the And gate;
  wherein the detector monitors the decision of the receiver to determine
when an exception has been requested by the digital data source.

2. A client device as claimed in claim 1, wherein the exception is a rate renegotiation.

3. A client device as claimed in claim 1, wherein the exception is indicated by a predetermined, in-band signal.

4. A client device as claimed in claim 3, wherein the decision feedback equalizer is adaptive.

5. A client device as claimed in claim 4, wherein the predetermined in-band signal does not impair the adaptation of the decision feedback equalizer.

6. A client device as claimed in claim 1, wherein the detector comprises a comparator that compares the decision to a maximum point in an active signal constellation.

7. A client device as claimed in claim 1, wherein said And gate includes inverters on predetermined inputs.

8. A client device as claimed in claim 1, wherein said And gate identifies a tinning mark.

9. A client device as claimed in claim 8, wherein said timing mark comprises a first sequence followed by a second sequence, said second sequence comprising the time-reversed sequence of said first sequence.

10. A client device as claimed in claim 8, wherein said timing mark comprises a first sequence followed by a second sequence whose sign bits are the inverse of said first sequence.

11. A client device as claimed in claim 1, wherein said counter provides an enabling signal to said And gate after a predetermined threshold count is exceeded.

12. A client device as claimed in claim 11, wherein said threshold count is at least 20.

13. A client device as claimed in claim 1, wherein said counter increments when said receiver decision indicates the receipt of a maximum point in an active constellation.

* * * * *